(12) United States Patent
Bass et al.

(10) Patent No.: US 10,218,166 B2
(45) Date of Patent: Feb. 26, 2019

(54) SYSTEM AND METHOD FOR DYNAMIC MONITORING OF CONTROLLER CURRENT CONSUMPTION

(71) Applicant: SanDisk Technologies, Inc., Plano, TX (US)

(72) Inventors: Simon Bass, Beer Sheva (IL); Vitali Linkovsky, Beer Sheva (IL); Leonid Minz, Beer Sheva (IL); Michael Tomashev, Ashdod (IL); Yair Baram, Metar (IL)

(73) Assignee: SanDisk Technologies LLC, Plano, TX (US)

(*) Notice: Subject to any disclaimer, the term of this patent is extended or adjusted under 35 U.S.C. 154(b) by 845 days.

(21) Appl. No.: 14/637,117

(22) Filed: Mar. 3, 2015

(65) Prior Publication Data
US 2016/0261104 A1 Sep. 8, 2016

(51) Int. Cl.
| | |
|---|---|
| *H02H 3/08* | (2006.01) |
| *G01R 19/165* | (2006.01) |
| *G01R 19/25* | (2006.01) |
| *G05F 1/46* | (2006.01) |
| *H02H 3/093* | (2006.01) |
| *H02H 3/033* | (2006.01) |

(52) U.S. Cl.
CPC .............. *H02H 3/08* (2013.01); *G05F 1/46* (2013.01); *H02H 3/0935* (2013.01); *H02H 3/033* (2013.01)

(58) Field of Classification Search
CPC ........ H02H 3/033; H02H 3/08; H02H 3/0935; G05F 1/46; G10R 19/16571; G10R 19/2509
USPC .......................................... 361/18
See application file for complete search history.

(56) References Cited

U.S. PATENT DOCUMENTS

| | | | |
|---|---|---|---|
| 2010/0070693 A1 | 3/2010 | Conley | |
| 2010/0289465 A1 | 11/2010 | Elran | |
| 2011/0149425 A1* | 6/2011 | Hatagami | ............... G11B 5/09 360/46 |
| 2014/0226417 A1 | 8/2014 | Lai | |

* cited by examiner

*Primary Examiner* — Kevin J Comber
(74) *Attorney, Agent, or Firm* — Brinks Gilson & Lione (57) ABSTRACT

Systems and methods for monitoring a regulated voltage output for current consumption are disclosed. An analog component senses the current at the regulated voltage output and converts the sensed current into a digital representation, which is indicative of the sensed current. A digital component inputs and analyzes the digital representation to determine whether to generate an interrupt. The interrupt is indicative to an electronic device, which is using the regulated voltage, to modify its operation. For example, the digital component may analyze the digital representation by counting a number of system clock cycles during a part of the digital representation. The counted number of clock cycles may be compared with a threshold, which may be predetermined or dynamically selected, to determine whether to generate an interrupt. Thus, the sensed current from the regulated voltage output may be used to determine whether to modify operation of the electronic device.

21 Claims, 9 Drawing Sheets

SYSTEM AND METHOD FOR DYNAMIC MONITORING OF CONTROLLER CURRENT CONSUMPTION

TECHNICAL FIELD

This application relates generally to monitoring operations in an electronic device. More specifically, this application relates to dynamically monitoring current consumption in the electronic device.

BACKGROUND

An electronic device typically includes one or more regulators. The regulator is designed to generate a steady voltage to power the load in the electronic device. In the event that the load is excessive, the voltage generated by the regulator may drop. To avoid this from occurring, the voltage at the output of the regulator is monitored to determine when the load is excessive.

OVERVIEW

According to one aspect, a monitoring device is disclosed. The monitoring device is configured to monitor current consumption on an output of a voltage regulator, which is configured to generate a regulated voltage for an electronic device. The monitoring device includes: an analog module configured to sense current on the output of the voltage regulator and to generate a digital representation of the sensed current; and a digital module. The digital component is configured to: input the digital representation of the sensed current; determine whether the digital representation is indicative of excessive current draw; and in response to determining that the digital representation is indicative of excessive current draw, generate an interrupt, the interrupt indicative to a controller of the electronic device to reset or to modify operation of part or all of the electronic device.

According to another aspect, a system on a chip is disclosed. The system on a chip includes: a voltage regulator including a regulated voltage output; a current sensing and digital conversion module configured to sense current on the regulated voltage output and to generate a digital representation of the sensed current; a digital representation analytical component configured to analyze the digital representation and to generate an interrupt; and a performance monitoring unit configured to input the interrupt and to modify operation of at least a part of the system in response to receipt of the interrupt.

According to yet another aspect, a method for monitoring current consumption on an output of a voltage regulator is disclosed. The method includes: sensing current on the output of the voltage regulator; generating, based at least in part on the sensed current, a digital representation of the current; analyzing the digital representation; comparing the analysis of the digital representation to a threshold; determining, based on comparing the analysis to the threshold, whether to generate an interrupt; and in response to determining to generate the interrupt, generating the interrupt, the interrupt indicative to modify operation of the electronic device.

Other features and advantages will become apparent upon review of the following drawings, detailed description and claims. Additionally, other embodiments are disclosed, and each of the embodiments can be used alone or together in combination. The embodiments will now be described with reference to the attached drawings.

BRIEF DESCRIPTION OF THE DRAWINGS

The system may be better understood with reference to the following drawings and description. In the figures, like reference numerals designate corresponding parts throughout the different views.

DETAILED DESCRIPTION

An electronic device may rely on one or more steady, regulated voltages for its operation. The regulated voltage may be generated by a variety of electronic components. One type of electronic component is a voltage regulator. A voltage regulator is configured to maintain a constant voltage level. The voltage regulator may be designed in one of several ways, such as by using a feed-forward design or by using negative feedback control loops.

One specific type of regulator is a low-dropout (LDO) regulator. An LDO regulator is a DC linear voltage regulator that can regulate the output voltage even when the supply voltage is very close to the output voltage. Other types of regulators are contemplated.

The voltage, as output by the regulator, may be supplied to a variety of electronic devices. One type of electronic device is a storage device. Other types of electronic devices are likewise contemplated. Discussed in more detail below, the storage device may include a variety of modules or functional sections. For example, complex system on chip (SoC) designs may have many power consuming modules. One such power consuming module may include an error correcting code (ECC) cores such as low density parity check (LDPC).

The voltage regulator may be designed in one of several ways to serve the different modules or functional sections of the electronic device. In one way, the voltage regulator may be designed with high margins such that the voltage regulator may output sufficient voltage even when most (or all) of the different modules of the electronic device rely on the regulated voltage. However, designing a voltage regulator sufficient to power all of the modules in the electronic device may not be feasible due to the size of the resultant voltage regulator. In another way, the voltage regulator may be designed with low margins, thereby resulting in a smaller footprint (e.g., achieving silicon area optimization as well as limiting the maximum power that should be supplied by both the host device and the voltage regulator). In this regard, the voltage regulator designed with low margins is unable to output sufficient voltage when most or all of the different modules of the electronic device rely on the regulated voltage. As a result of the voltage regulator with the smaller footprint, the electronic device may malfunction when the output load of the regulator exceeds its limit. Further, as a consequence, the output voltage of the regulator may drop below the minimum allowed supplied voltage level.

The output of the regulator may be monitored in several ways. In one embodiment, the output voltage of the regulator may be monitored. More specifically, in response to determining that the output voltage drops below a minimum predetermined allowed supplied voltage level, a power on reset (POR) circuit resets the electronic device.

In another embodiment, the current output by the regulator may be monitored. In a more specific embodiment, the output current may be regulated using two components: an analog current sensing and conversion to digital signal component; and a digital component that generates an interrupt. As discussed in more detail below, the analog current sensing and conversion to digital signal component may measure the load of the voltage regulator, and generate a digital signal component that is indicative of the measured load. The digital component may compare the digital signal component to a threshold (such as a predetermined threshold or a dynamically set threshold), and based on the comparison, generate an interrupt to a power management unit. In response to receipt of the interrupt, the power management unit may reset part or all of the electronic device (e.g., turn off one or more modules in the electronic device) or may modify operation of part or all of the electronic device (e.g., reduce the clock frequency).

As discussed above, various electronic devices may use a regulated voltage. One type of electronic device that uses a regulated voltage is a memory system, with the discussion below focusing on a memory system. Thus, in one embodiment, the analog current sensing and conversion to digital signal component and the digital component that generates an interrupt may be used along with (or within) a memory system. In an alternative embodiment, the analog current sensing and conversion to digital signal component and the digital component that generates an interrupt may be used along with (or within) other electronic devices. For example, another type of electronic device that uses a regulated voltage is a power management system. The two types of electronic devices disclosed are merely for illustration purposes. Other types of electronic devices are contemplated. In this regard, any discussion herein directed to a memory system may likewise be applied to other electronic devices.

Figure 1A:
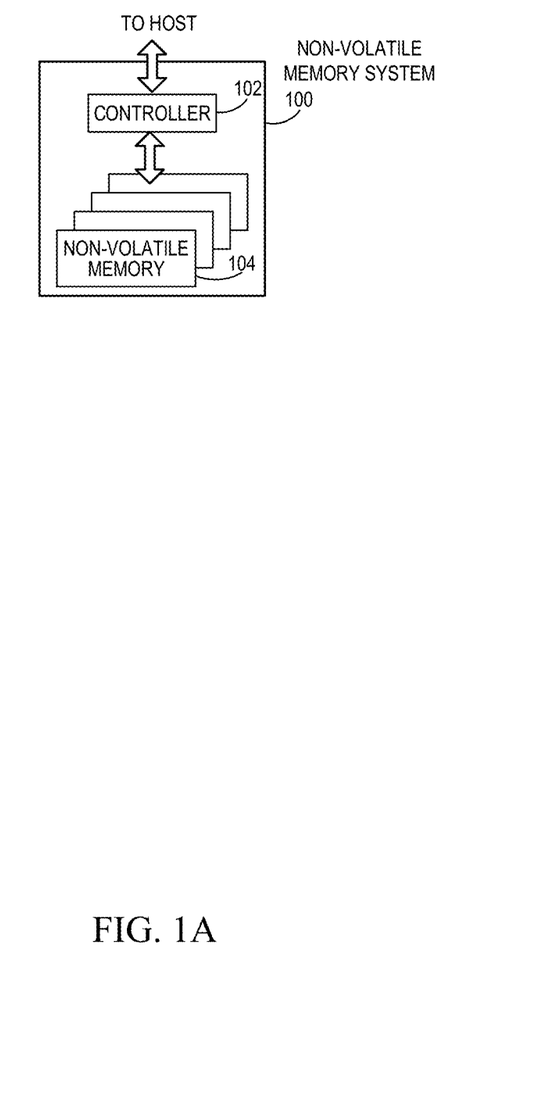
FIG. 1A is a block diagram of an example non-volatile memory system.

FIG. 1A is a block diagram illustrating a non-volatile memory system. The non-volatile memory system 100 includes a controller 102 and non-volatile memory that may be made up of one or more non-volatile memory die 104. One or both of the controller 102 and non-volatile memory die 104 may use a regulated voltage. As used herein, the term die refers to the set of non-volatile memory cells, and associated circuitry for managing the physical operation of those non-volatile memory cells, that are formed on a single semiconductor substrate. Controller 102 interfaces with a host system and transmits command sequences for read, program, and erase operations to non-volatile memory die 104.

The controller 102 (which may be a flash memory controller) can take the form of processing circuitry, a microprocessor or processor, and a computer-readable medium that stores computer-readable program code (e.g., software or firmware) executable by the (micro)processor, logic gates, switches, an application specific integrated circuit (ASIC), a programmable logic controller, and an embedded microcontroller, for example. The controller 102 can be configured with hardware and/or firmware to perform the various functions described below and shown in the flow diagrams. Also, some of the components shown as being internal to the controller can also be stored external to the controller, and other components can be used. Additionally, the phrase "operatively in communication with" could mean directly in communication with or indirectly (wired or wireless) in communication with through one or more components, which may or may not be shown or described herein.

As used herein, a flash memory controller is a device that manages data stored on flash memory and communicates with a host, such as a computer or electronic device. A flash memory controller can have various functionality in addition to the specific functionality described herein. For example, the flash memory controller can format the flash memory to ensure the memory is operating properly, map out bad flash memory cells, and allocate spare cells to be substituted for future failed cells. Some part of the spare cells can be used to hold firmware to operate the flash memory controller and implement other features. In operation, when a host needs to read data from or write data to the flash memory, it will communicate with the flash memory controller. If the host provides a logical address to which data is to be read/written, the flash memory controller can convert the logical address received from the host to a physical address in the flash memory. (Alternatively, the host can provide the physical address). The flash memory controller can also perform various memory management functions, such as, but not limited to, wear leveling (distributing writes to avoid wearing out specific blocks of memory that would otherwise be repeatedly written to) and garbage collection (after a block is full, moving only the valid pages of data to a new block, so the full block can be erased and reused).

Non-volatile memory die 104 may include any suitable non-volatile storage medium, including NAND flash memory cells and/or NOR flash memory cells. One example of non-volatile memory die 104 may comprise a memory integrated circuit chip. The memory cells can take the form of solid-state (e.g., flash) memory cells and can be one-time programmable, few-time programmable, or many-time programmable. The memory cells can also be single-level cells (SLC), multiple-level cells (MLC), triple-level cells (TLC), or use other memory cell level technologies, now known or later developed. Also, the memory cells can be fabricated in a two-dimensional or three-dimensional fashion.

The interface between controller 102 and non-volatile memory die 104 may be any suitable flash interface, such as Toggle Mode 200, 400, or 800. In one embodiment, memory system 100 may be a card based system, such as a secure digital (SD) or a micro secure digital (micro-SD) card. In an alternate embodiment, memory system 100 may be part of an embedded memory system.

Figure 1B:
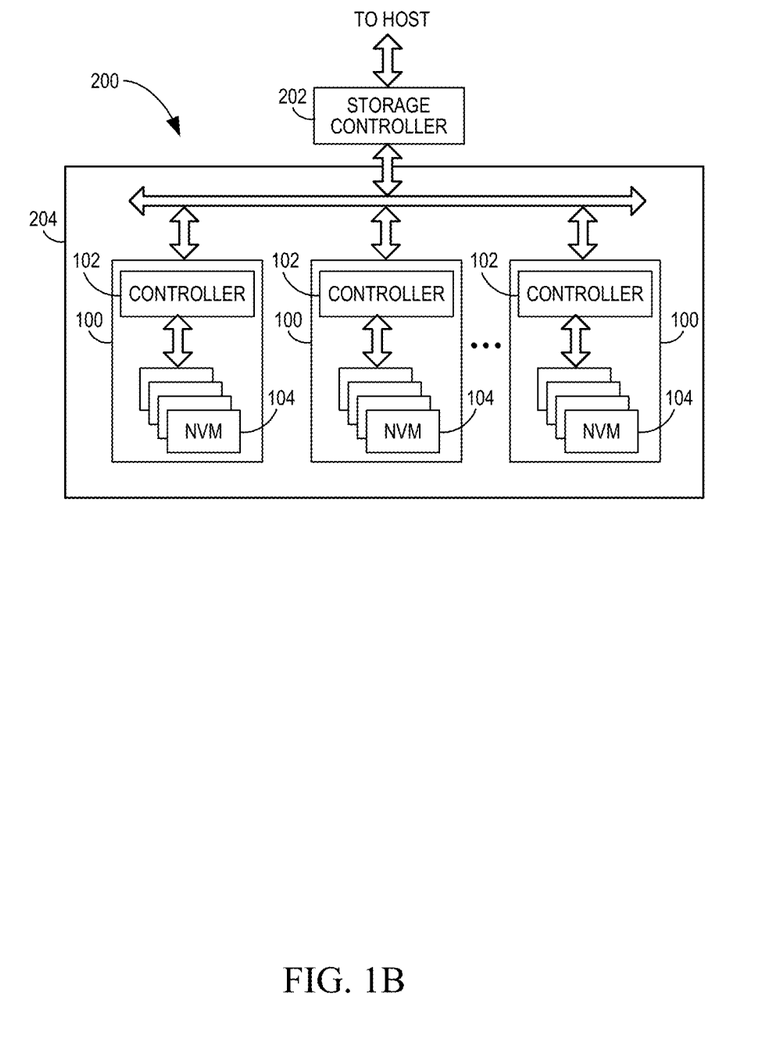
FIG. 1B is a block diagram illustrating an exemplary storage module.
Figure 1C:
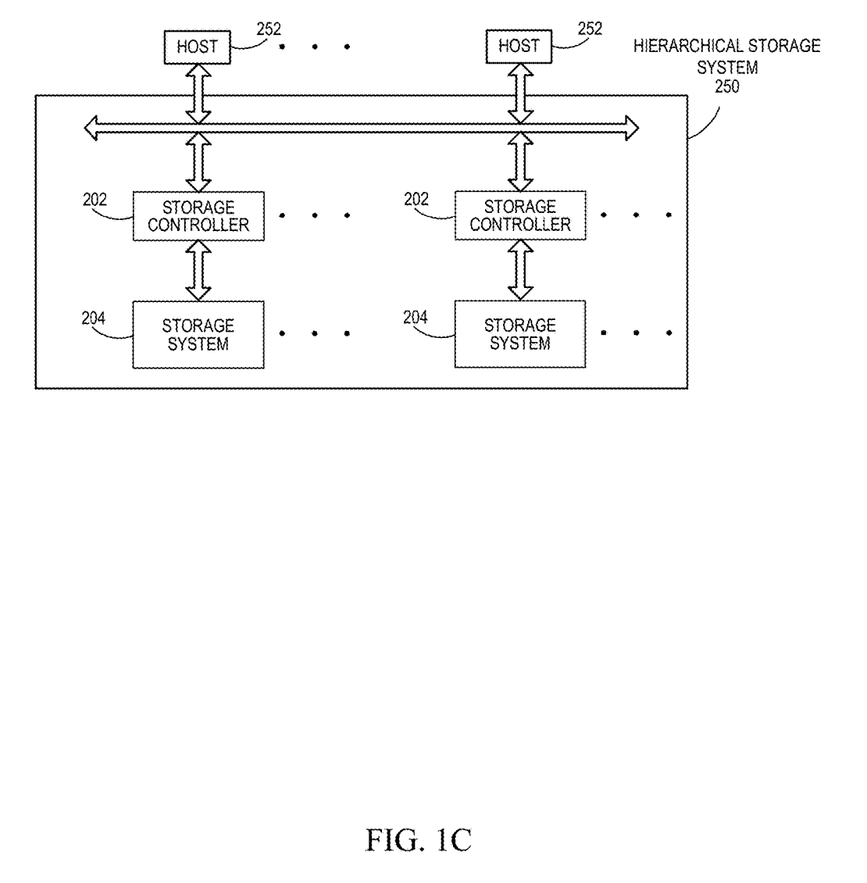
FIG. 1C is a block diagram illustrating a hierarchical storage system.

Although in the example illustrated in FIG. 1A non-volatile memory system 100 includes a single channel between controller 102 and non-volatile memory die 104, the subject matter described herein is not limited to having a single memory channel. For example, in some NAND memory system architectures such as illustrated in FIGS.

1B-C, 2, 4, 8 or more NAND channels may exist between the controller and the NAND memory device, depending on controller capabilities. In any of the embodiments described herein, more than a single channel may exist between the controller and the memory die, even if a single channel is shown in the drawings.

FIG. 1B illustrates a storage module 200 that includes plural non-volatile memory systems 100. As such, storage module 200 may include a storage controller 202 that interfaces with a host and with storage system 204, which includes a plurality of non-volatile memory systems 100. The interface between storage controller 202 and non-volatile memory systems 100 may be a bus interface, such as a serial advanced technology attachment (SATA) or peripheral component interface express (PCIe) interface. Storage module 200, in one embodiment, may be a solid state drive (SSD), such as found in portable computing devices, such as laptop computers, and tablet computers.

FIG. 1C is a block diagram illustrating a hierarchical storage system. A hierarchical storage system 210 includes a plurality of storage controllers 202, each of which controls a respective storage system 204. Host systems 212 may access memories within the hierarchical storage system via a bus interface. In one embodiment, the bus interface may be a non-volatile memory express (NVMe) or a fiber channel over Ethernet (FCoE) interface. In one embodiment, the system illustrated in FIG. 1C may be a rack mountable mass storage system that is accessible by multiple host computers, such as would be found in a data center or other location where mass storage is needed.

Figure 2A:
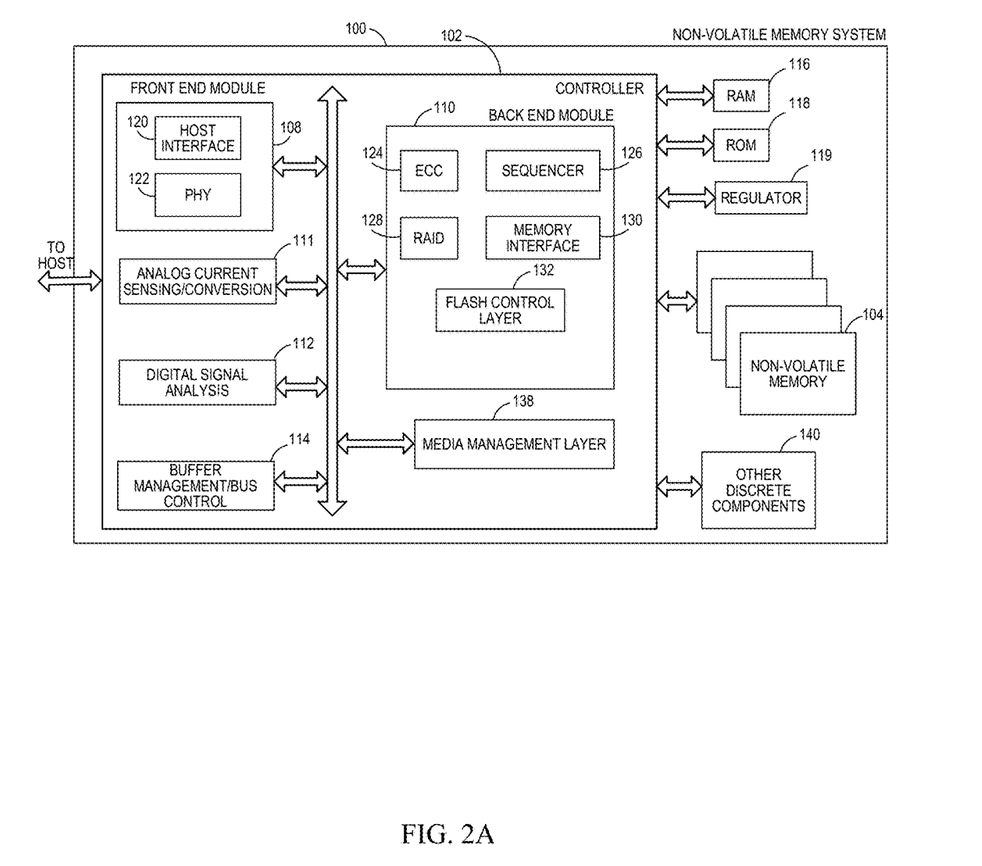
FIG. 2A is a block diagram illustrating exemplary components of a controller of a non-volatile memory system.

FIG. 2A is a block diagram illustrating exemplary components of controller 102 in more detail. Controller 102 includes a front end module 108 that interfaces with a host, a back end module 110 that interfaces with the one or more non-volatile memory die 104, and various other modules that perform functions which will now be described in detail.

A module may take the form of a packaged functional hardware unit designed for use with other components, a portion of a program code (e.g., software or firmware) executable by a (micro)processor or processing circuitry that usually performs a particular function of related functions, or a self-contained hardware or software component that interfaces with a larger system, for example.

Modules of the controller 102 may include an analog current sensing/conversion module 111 and a digital signal analysis module 112. As explained in more detail below, the analog current sensing/conversion module 111 may sense an analog current from an output of the regulator 119 (such as a voltage output of regulator 119) and may convert the sensed analog current into a digital representation. The digital signal analysis module 112 is configured to receive the digital representation, to analyze the digital representation (such as to count a number of system clock cycles during a part of the digital representation), and based on the analysis, to determine whether to generate an interrupt (such as to compare the counted number of system clock cycles with a threshold). While in some implementations the analog current sensing/conversion module 111 and the digital signal analysis module 112 may be part of the controller 102, in other implementations, all or a portion of the analog current sensing/conversion module 111 and the digital signal analysis module 112 may be discrete components, separate from the controller 102, that interface with the controller 102. For example, the digital signal analysis module 112 may be included in controller 102 whereas the analog current sensing/conversion module 111 may be separate from, and provide the digital representation as an input to, controller 102.

Referring again to modules of the controller 102, a buffer manager/bus controller 114 manages buffers in random access memory (RAM) 116 and controls the internal bus arbitration of controller 102. A read only memory (ROM) 118 stores system boot code. Although illustrated in FIG. 2A as located separately from the controller 102, in other embodiments one or both of the RAM 116 and ROM 118 may be located within the controller. In yet other embodiments, portions of RAM and ROM may be located both within the controller 102 and outside the controller. Further, in some implementations, the controller 102, RAM 116, and ROM 118 may be located on separate semiconductor die.

Front end module 108 includes a host interface 120 and a physical layer interface (PHY) 122 that provide the electrical interface with the host or next level storage controller. The choice of the type of host interface 120 can depend on the type of memory being used. Examples of host interfaces 120 include, but are not limited to, SATA, SATA Express, SAS, Fibre Channel, USB, PCIe, and NVMe. The host interface 120 typically facilitates transfer for data, control signals, and timing signals.

Back end module 110 includes an error correction controller (ECC) engine 124 that encodes the data bytes received from the host, and decodes and error corrects the data bytes read from the non-volatile memory. A command sequencer 126 generates command sequences, such as program and erase command sequences, to be transmitted to non-volatile memory die 104. A RAID (Redundant Array of Independent Drives) module 128 manages generation of RAID parity and recovery of failed data. The RAID parity may be used as an additional level of integrity protection for the data being written into the non-volatile memory system 100. In some cases, the RAID module 128 may be a part of the ECC engine 124. A memory interface 130 provides the command sequences to non-volatile memory die 104 and receives status information from non-volatile memory die 104. In one embodiment, memory interface 130 may be a double data rate (DDR) interface, such as a Toggle Mode 200, 400, or 800 interface. A flash control layer 132 controls the overall operation of back end module 110.

Additional components of system 100 illustrated in FIG. 2A include media management layer 138, which performs wear leveling of memory cells of non-volatile memory die 104. System 100 also includes other discrete components 140, such as external electrical interfaces, external RAM, resistors, capacitors, or other components that may interface with controller 102.

In alternative embodiments, one or more of the physical layer interface 122, RAID module 128, media management layer 138 and buffer management/bus controller 114 are optional components that are not necessary in the controller 102.

Figure 2B:
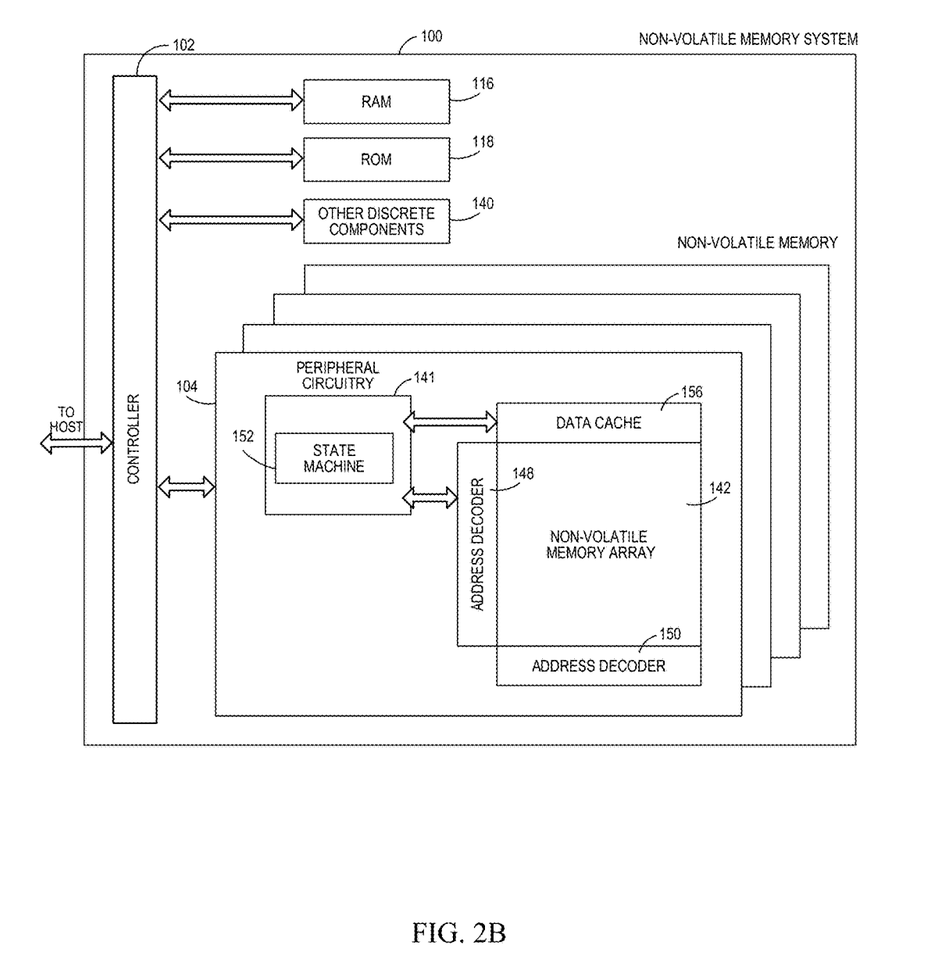
FIG. 2B is a block diagram illustrating exemplary components of a non-volatile memory of a non-volatile memory storage system.

FIG. 2B is a block diagram illustrating exemplary components of non-volatile memory die 104 in more detail. Non-volatile memory die 104 includes peripheral circuitry 141 and non-volatile memory array 142. Non-volatile memory array 142 includes the non-volatile memory cells used to store data. The non-volatile memory cells may be any suitable non-volatile memory cells, including NAND flash memory cells and/or NOR flash memory cells in a two dimensional and/or three dimensional configuration. Peripheral circuitry 141 includes a state machine 152 that provides status information to controller 102. Non-volatile memory die 104 further includes address decoders 148, 150 for addressing within non-volatile memory array 142, and a data cache 156 that caches data.

Figure 3:
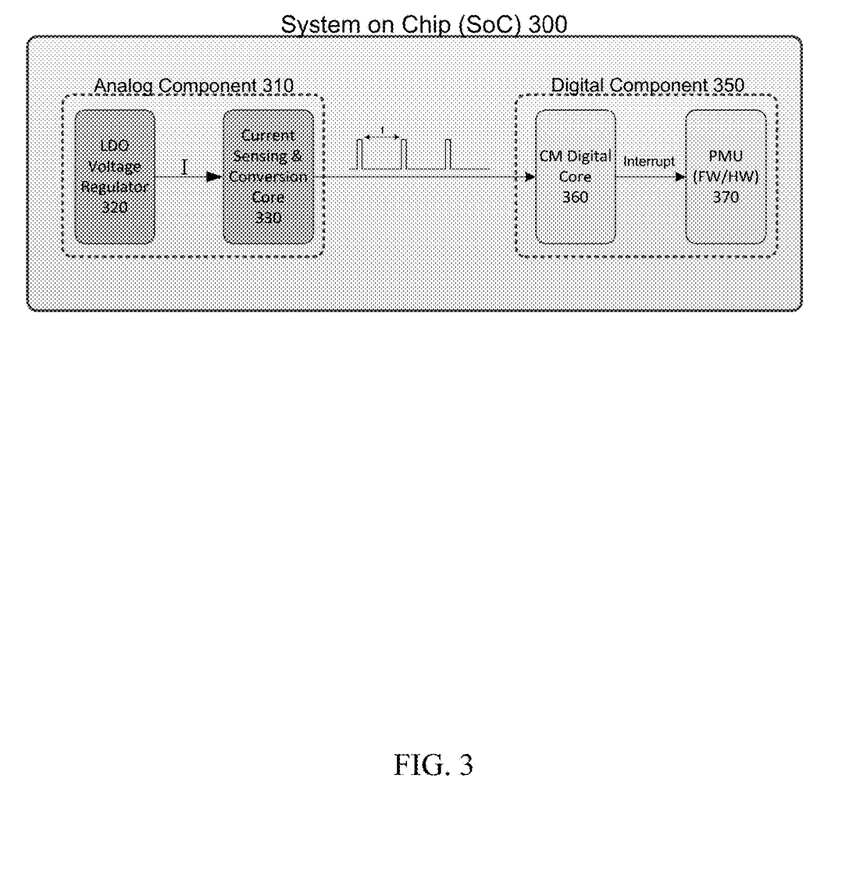
FIG. 3 illustrates a block diagram of a system on a chip (SoC).

FIG. 3 illustrates a block diagram of a system on a chip (SoC) 300. An SoC is one example of an integrated circuit that integrates some or all components of an electronic device into a single chip. As illustrated in FIG. 3, the SoC 300 includes both analog and digital functions on a single chip substrate.

The SoC 300 includes analog component 310 and digital component 350. As illustrated in FIG. 3, analog component 310 is configured to sense the current output from the LDO voltage regulator and to generate a digital representation. Part or all of the digital representation may be based on the sensed current. In one embodiment, part or all of the digital representation is inversely proportional to the sensed current. In an alternate embodiment, part or all of the digital representation is directly proportional to the sensed current. The digital representation is then input to the digital component 350 for analysis.

More specifically, analog component 310 includes LDO voltage regulator 320 and current sensing & conversion core 330. As discussed above, one type of voltage regulator is an LDO regulator. In this regard, although an LDO voltage regulator is illustrated in FIG. 3, other types of voltage regulators are contemplated. Further, although FIG. 3 illustrates that analog component 310 includes all of LDO voltage regulator 320, less than all of LDO voltage regulator 320 may be included in analog component 310.

As discussed in more detail below, LDO voltage regulator 320 may include one or more output lines on which is a regulated voltage (or regulated voltages). The current sensing & conversion component 330 may sense the current on one, some, or all of the output lines of the LDO voltage regulator 320. This is illustrated in FIG. 3 as the current (I) input to current sensing & conversion component 330. As discussed in more detail below, the current sensing & conversion component 330 is configured to perform two functions: (i) sense the current (I); and (ii) convert the sensed current into a digital representation. The digital representation is generated as an output of the current sensing & conversion component 330, as illustrated in FIG. 3.

Digital component 350 includes current measurement (CM) digital core 360 and performance monitoring unit (PMU) 370. The CM digital core 360 is configured to input the digital representation, to analyze the digital representation, and, based on the analysis, to generate an interrupt for output to the PMU 370. As discussed in more detail below, the CM digital core 360 may analyze the digital representation by determining an indication as to the amount of current drawn by the voltage regulator output. The PMU 370 may receive the interrupt generated by the CM digital core 360. In response to receipt of the interrupt, the PMU 370 may perform one or more actions including: resetting part or all of the SoC 300; or modifying operation of part or all of the SoC 300. For example, the PMU 370 may disable or reset the entire SoC 300. As another example, the PMU 370 may disable or reset less than all of SoC 300, such as only one component of SoC 300. As discussed above, the storage device may include an ECC core. In response to receipt of the interrupt, the PMU 370 may disable the ECC core. Further, in a more specific embodiment, in response to receipt of the first interrupt from CM digital core 360, the PMU 370 may first disable less than all of the SoC 300, such as the ECC core. In response to a second interrupt from CM digital core 360, the PMU 370 may then disable the entire SoC 300. As still another example, in response to receipt of the interrupt, the PMU 370 may modify operation of part or all of the SoC 300, such as reducing the system clock for the SoC 300. The PMU 370 may comprise hardware, firmware, or a combination of hardware and firmware.

Figure 4:
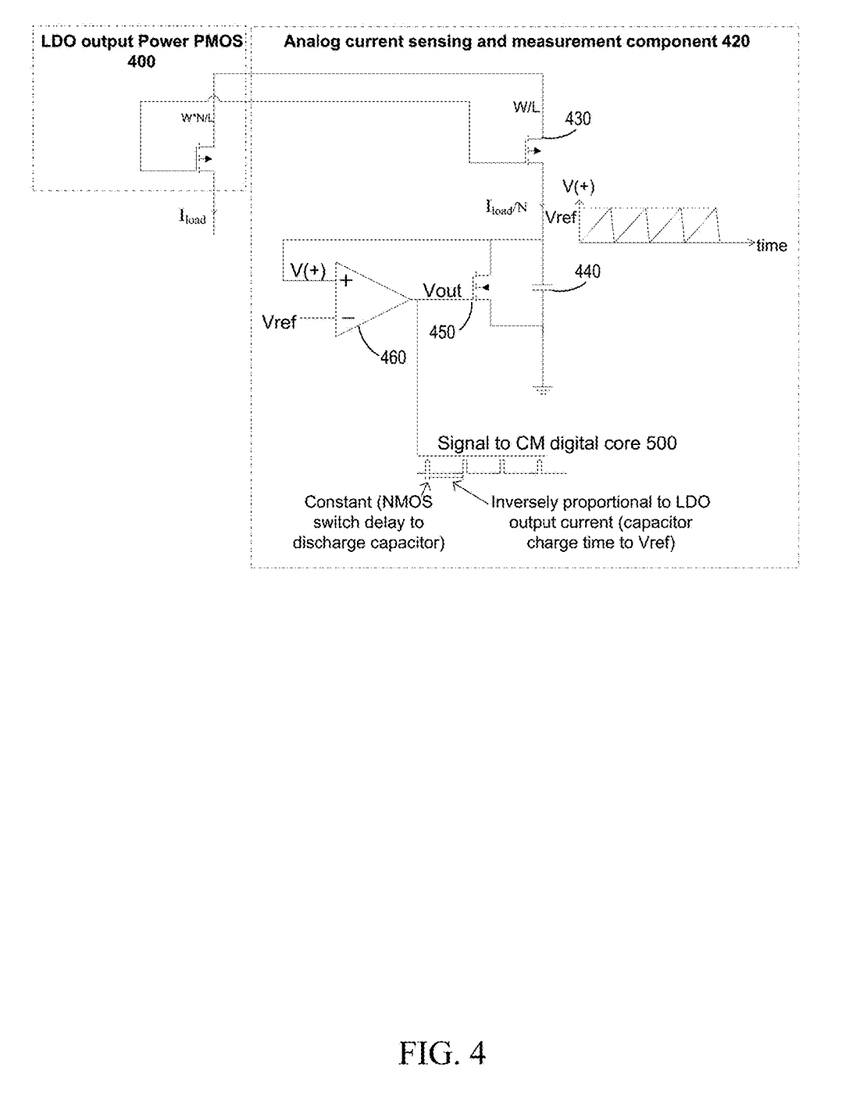
FIG. 4 illustrates a block diagram of part of the analog component as illustrated in FIG. 3.

FIG. 4 illustrates a block diagram of part of the analog component as illustrated in FIG. 3 including LDO output power PMOS 400 and analog current sensing and measurement component 420. LDO output power PMOS 400 illustrates the circuit element (the PMOS transistor) that generates the output current $I_{load}$.

Analog current sensing and measurement component 420 includes a current mirror, mirroring the current output from the voltage regulator. More specifically, FIG. 4 illustrates the current mirror as PMOS transistor 430, which is sized relative to PMOS transistor 400. In one embodiment, PMOS transistor 430 is N times smaller than PMOS 400, resulting in the mirrored current being $I_{load}/N$. In this regard, reducing the reflected current significantly, such as by selecting a larger N, allows for the capacitor selected (capacitor 440, discussed below) to be of lower value, thereby saving silicon area.

Analog current sensing and measurement component 420 further generates a digital representation based on the mirrored current. In one embodiment, as illustrated in FIG. 4, the digital representation is generated by using a capacitor 440, an NMOS transistor 450 and an amplifier 460. The mirrored current charges capacitor 440, with the charging of the circuit at node V(+) illustrated by the sawtooth wave depicted in FIG. 4. When the voltage at V(+) equals Vref, the amplifier 460 turns on (outputs logic 1), thereby turning on NMOS transistor 450, and in turn discharging capacitor 440. As a result, the voltage at Vout is illustrated in FIG. 4 with two separate periods: (1) a first period at logic 1 in which NMOS transistor is on and the capacitor is discharging; (2) a second period at logic 0 during which the capacitor is being charged to Vref. The first period is constant, being dependent on the NMOS transistor 450 and the capacitor 440. The second period is inversely proportional to the LDO output current. In this regard, only a part of the digital representation (e.g., the second period) is dependent on the LDO output current. Thus, if the LDO output current is greater, the second period is shorter. Conversely, if the LDO output current is less, the second period is longer. Therefore, in one embodiment, a part of the digital representation (e.g., the second period) is inversely proportional to the LDO output current. The voltage at Vout is an example of the digital representation of the LDO output current that is sent to the CM Digital Core 500. The digital representation of Vout is merely for illustration purposes. Other digital representations of the $I_{load}$ are contemplated. For example, in an alternate embodiment, a part of the digital representation may be directly proportional to the LDO output current.

Examples of values for the analog current sensing and measurement component 420 include: Vref=0.85V; and capacitor 440 ~=27 pF. Given these values, the duration for the first period is ~10 nSec and the duration for the second period is (with an LDO current of 120 mA) ~1 µSec. These values are merely for purposes of illustration. Other values are contemplated.

Figure 5:
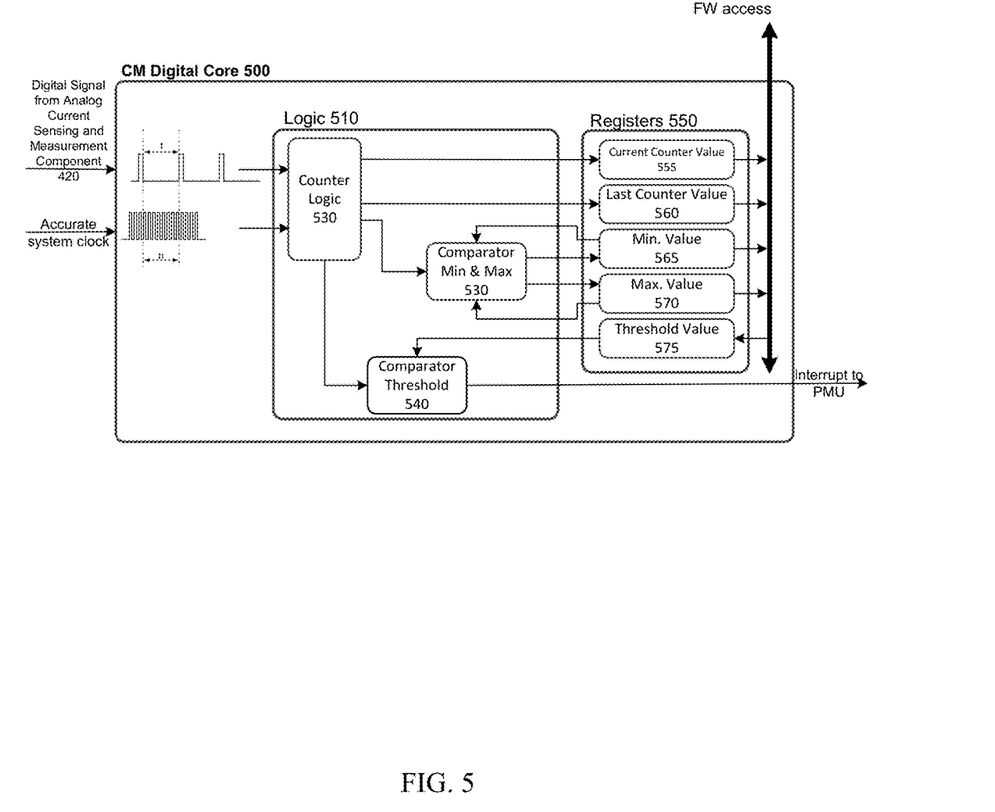
FIG. 5 illustrates a block diagram of the CM digital core as illustrated in FIG. 3.

FIG. 5 illustrates a block diagram of the CM digital core 500 as illustrated in FIG. 3. One or more signals may be transmitted from analog current sensing and measurement component 420. As illustrated in FIG. 5, the digital signal (Vout) from analog current sensing and measurement component 420 may be input to CM digital core 500. As discussed above, a part of the digital signal (illustrated at time "t") is inversely proportional to $I_{load}$. In an alternate embodiment, part or all of the digital signal may be directly proportional to $I_{load}$.

In one embodiment, another signal, such as system clock, may be input as well. The system clock may be routed to CM digital core 500 via a section of the digital component 350.

CM digital core 500 may analyze the digital signal from analog current sensing and measurement component 420. The analysis performed by CM digital core 500 may comprise determining an indication of the $I_{load}$ based on analysis of the digital signal from analog current sensing and measurement component 420. In one embodiment, the analysis may comprise counter logic 530, which is configured to count a number of system clock cycles (indicated as "n" clock cycles) during time period "t". Counting during time period "t" is one example of the analysis performed by CM digital core 500. Other forms of analysis are contemplated. In this regard, counter logic 530 may output the number of clock cycles counted to one or more modules, such as comparator minimum & maximum 530 and comparator threshold 540.

Comparator threshold 540 may compare the number of system clock cycles to a threshold. As illustrated in FIG. 5, the threshold used by comparator threshold 540 may be provided by threshold value 575. The threshold stored in threshold value 575 may be predetermined and static, or may be dynamically determined. In one embodiment, the threshold is predetermined and static. More specifically, the threshold may be pre-programmed into a memory of the monitoring device upon manufacture.

In an alternate embodiment, the threshold may be dynamically determined. In a first more specific embodiment, the threshold may be dynamically determined based on a current operation of the electronic device. For example, the electronic device may include a plurality of components, each of which requiring a certain amount of power (or current). The monitoring device may determine which of the plurality of components is current operating and, based on the determination, calculate a threshold necessary to meet the current operating requirements. More specifically, different components may require different operating voltages to function properly. As one example, a first component may require a 1.1V stable voltage, whereas a second component may require a 1.06V stable voltage. In response to determining that only the second component is operating, the threshold may be dynamically selected such that an interrupt is generated only when the sensed current indicates that at least a 1.06V stable voltage cannot be achieved. In this regard, the threshold may change based on which of the components is currently operating. In a second more specific embodiment, the threshold may be determined based on one or more look-up tables. Upon manufacture, a memory may be programmed with a characteristic of the electronic device. The characteristic may comprise a type of operation (e.g., a "fast" system or a "slow" system) or may comprise a voltage necessary for operation (e.g., 1.1V). Further, a look-up table may correlate characteristics to thresholds. For example, the look-up table may correlate a "fast" system to a first threshold, and a "slow" system to a second threshold. In practice, the monitoring device may access the memory to determine the value of the characteristic (e.g., a "fast" system), and use the value of the characteristic in the look-up table to determine the threshold.

Depending on the type of digital signal, comparator threshold 540 may perform different comparisons with the threshold as provided by threshold value 575. As discussed above with respect to FIG. 4, time period "t", which was previously described as the second period in the digital representation, is inversely proportional to $I_{load}$. Thus, the number of system clock cycles (n) will be lower when $I_{load}$ is higher. In this regard, comparator threshold 540 may compare the number of system clock cycles (n) with the threshold to determine whether the number of system clock cycles (n) is less than the threshold. In response to determining that the number of system clock cycles (n) is less than the threshold, the comparator threshold 530 may generate an interrupt to the PMU. In an alternate embodiment in which the digital representation is directly proportional to $I_{load}$, comparator threshold 540 may compare whether the number of system clock cycles (n) is greater than the threshold, and in response to determining that the number of system clock cycles (n) is greater than the threshold, the comparator threshold may generate an interrupt to the PMU.

Counter logic 530 may likewise output the count value to one or more registers, such as current counter value 555 and last counter value 560. Current counter value 555 stores the current value of the counter and last counter value 560 stores the previous value of the counter, respectively, as generated by counter logic 530. For example, the value stored in current counter value 555 may be incremented as counter counts during the time "t" of the digital representation. When the logic "1" in the digital signal is identified, the value stored in current counter value 555 may be transferred into last counter value 560.

Thus, in one embodiment, a value, generated by counter logic 530, is compared with the value stored in threshold value 575. In a more specific embodiment, the value stored in last counter value 560 is compared with the value stored in threshold value 575. As discussed in more detail below, another part of the storage device, such as the firmware, may analyze the current and previous value(s) of the counter.

Further, comparator minimum & maximum 530 may determine whether the counter value is less than a previously determined minimum counter value or greater than a previously determined maximum counter value. In particular, counter logic 530 may input the counter value to comparator minimum & maximum 530. Similar, registers which store the previously determined minimum counter value and the maximum counter value in registers 565 and 570, respectively, are likewise input to comparator minimum & maximum 530. In this way, comparator minimum & maximum 530 may compare the counter value to determine whether it is less than the previously determined minimum value (as indicated by register 565) or greater than the previously determined maximum value (as indicated by register 570). In response to comparator minimum & maximum 530 determining that the counter value is less than the previously determined minimum value, comparator minimum & maximum 530 updates register 565 with the counter value. Similarly, in response to comparator minimum & maximum 530 determining that the counter value is greater than the previously determined maximum value, comparator minimum & maximum 530 updates register 570 with the counter value. As discussed in more detail below, the values, as stored in registers 565 and 570, may be used to determine the threshold value stored in register 575.

Figure 6:
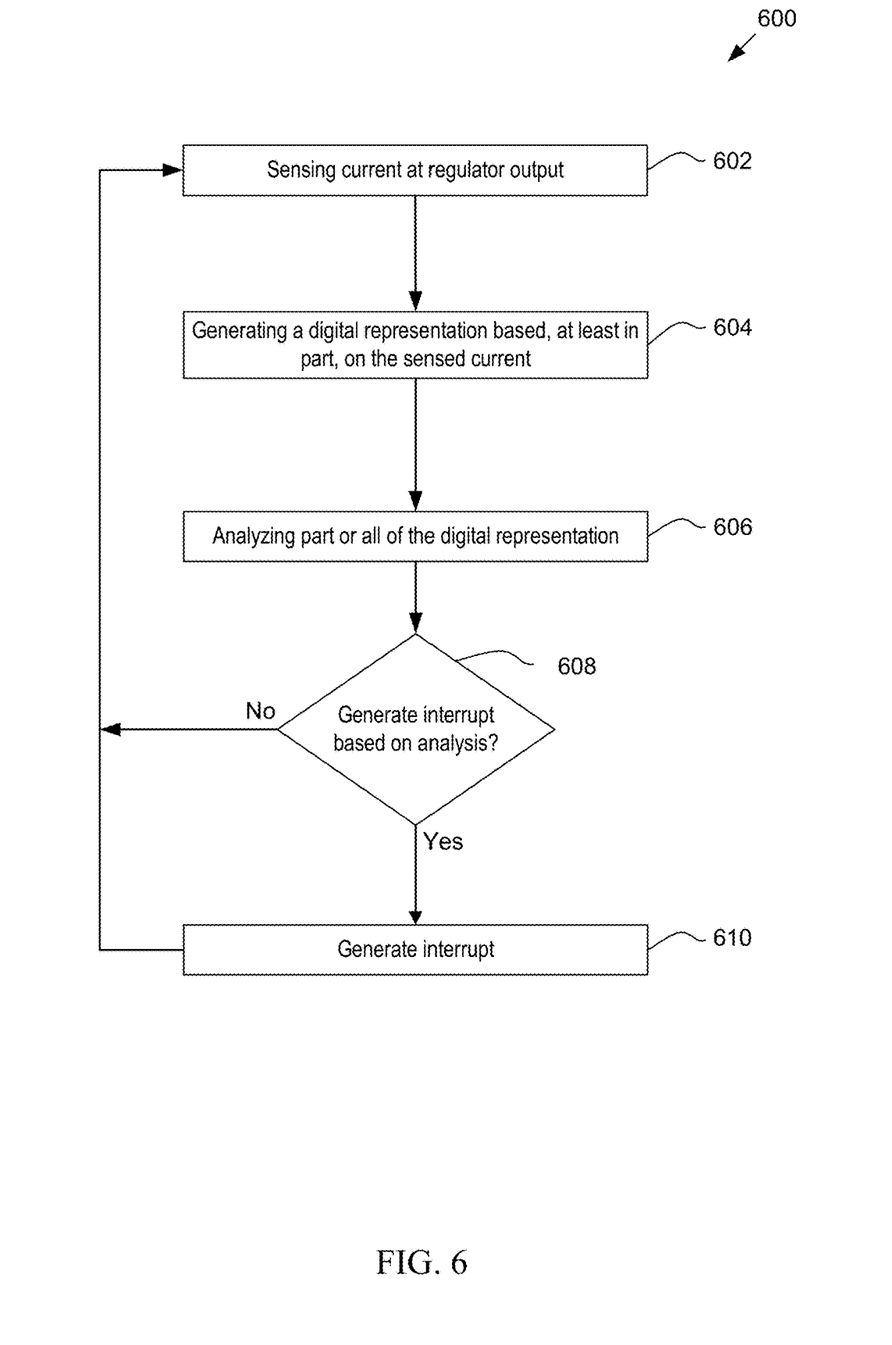
FIG. 6 illustrates a flow chart of an example of a monitoring device, which may include the analog component and the digital component, determining whether to generate an interrupt based on the sensed current.

FIG. 6 illustrates a flow chart 600 of an example of a monitoring device, which may include the analog component and the digital component, determining whether to generate an interrupt based on the sensed current. At 602, the current is sensed at the regulator output. As discussed above, the current may be sensed in a variety of ways, such as by using a current mirror.

At 604, a digital representation is generated based, at least in part, on the sensed current. As discussed above, the digital representation may be directly proportional or inversely proportional to the sensed current. Further, part or all the digital representation may be based on the sensed current. For example, in one embodiment, only a part, but not all, of the digital representation may be based on the sensed current.

At 606, part or all of the digital representation may be analyzed. As discussed above, the analysis of the digital representation may be performed in a variety of ways. For example, in the embodiment where only a part of the digital representation is based on the sensed current, that part is only analyzed. The analysis may comprise, for example, counting the number of system clock pulses during the part of the digital representation.

At 608, it is determined whether to generate an interrupt based on the analysis. As discussed above, the determination whether to generate the interrupt may be performed in one of several ways. In one embodiment, the analysis performed at 606 may be compared with a threshold to determine whether to generate the interrupt. The threshold may be predetermined and static, or may be dynamically selected. Further, in one embodiment (where the digital representation is inversely proportional to the sensed current), the interrupt is triggered when the analysis performed at 606 is less than the threshold. In an alternate embodiment (where the digital representation is directly proportional to the sensed current), the interrupt is triggered when the analysis performed at 606 is greater than the threshold. In this regard, various types of comparisons are envisioned.

In a more specific embodiment, wherein the analysis comprises counting the number of system clock pulses counted during the part of the digital representation, the number of system clock pulses are compared with the threshold. In the instance where the digital representation is inversely proportional to the sensed current, the interrupt is triggered if the number of system clock pulses is less than the threshold. In response to determining not to generate an interrupt, the flow chart 600 loops back to 602. In response to determining to generate an interrupt, the flow chart loops to 610.

At 610, the interrupt is generated. In the instance where the digital component is a separate component from the controller of the electronic device, the interrupt may comprise a signal input to the controller, with the signal indicative to the controller of the interrupt. In the instance where the digital component is integrated within the controller of the electronic device, the interrupt may comprise a software interrupt to another section the controller, with the software interrupt indicative to the another section of the controller that an interrupt has occurred.

Regardless of the form of the interrupt, the controller of the electronic device may perform one or more actions in response to receipt of the interrupt. In one embodiment, the controller may terminate operation of part or all of the electronic device. For example, the controller may terminate operation of only one component of the electronic device. In the example of a storage device with an ECC engine, the controller may terminate operation of the ECC engine. In an alternate embodiment, the controller may modify operation of part or all of the electronic device. For example, the controller may modify operation of the clock, such as reducing the speed of the clock.

In the present application, semiconductor memory systems such as those described in the present application may include volatile memory systems, such as dynamic random access memory ("DRAM") or static random access memory ("SRAM") devices, non-volatile memory systems, such as resistive random access memory ("ReRAM"), electrically erasable programmable read only memory ("EEPROM"), flash memory (which can also be considered a subset of EEPROM), ferroelectric random access memory ("FRAM"), and magnetoresistive random access memory ("MRAM"), and other semiconductor elements capable of storing information. Each type of memory system may have different configurations. For example, flash memory systems may be configured in a NAND or a NOR configuration.

The memory systems can be formed from passive and/or active elements, in any combinations. By way of non-limiting example, passive semiconductor memory elements include ReRAM device elements, which in some embodiments include a resistivity switching storage element, such as an anti-fuse, phase change material, etc., and optionally a steering element, such as a diode, etc. Further by way of non-limiting example, active semiconductor memory elements include EEPROM and flash memory system elements, which in some embodiments include elements containing a charge storage region, such as a floating gate, conductive nanoparticles, or a charge storage dielectric material.

Multiple memory elements may be configured so that they are connected in series or so that each element is individually accessible. By way of non-limiting example, flash memory systems in a NAND configuration (NAND memory) typically contain memory elements connected in series. A NAND memory array may be configured so that the array is composed of multiple strings of memory in which a string is composed of multiple memory elements sharing a single bit line and accessed as a group. Alternatively, memory elements may be configured so that each element is individually accessible, e.g., a NOR memory array. NAND and NOR memory configurations are exemplary, and memory elements may be otherwise configured.

The semiconductor memory elements located within and/or over a substrate may be arranged in two or three dimensions, such as a two dimensional memory structure or a three dimensional memory structure.

In a two dimensional memory structure, the semiconductor memory elements are arranged in a single plane or a single memory system level. Typically, in a two dimensional memory structure, memory elements are arranged in a plane (e.g., in an x-z direction plane) which extends substantially parallel to a major surface of a substrate that supports the memory elements. The substrate may be a wafer over or in which the layer of the memory elements are formed or it may be a carrier substrate which is attached to the memory elements after they are formed. As a non-limiting example, the substrate may include a semiconductor such as silicon.

The memory elements may be arranged in the single memory system level in an ordered array, such as in a plurality of rows and/or columns. However, the memory elements may be arrayed in non-regular or non-orthogonal configurations. The memory elements may each have two or more electrodes or contact lines, such as bit lines and word lines.

A three dimensional memory array is arranged so that memory elements occupy multiple planes or multiple memory system levels, thereby forming a structure in three dimensions (i.e., in the x, y and z directions, where the y direction is substantially perpendicular and the x and z directions are substantially parallel to the major surface of the substrate).

As a non-limiting example, a three dimensional memory structure may be vertically arranged as a stack of multiple two dimensional memory system levels. As another non-limiting example, a three dimensional memory array may be arranged as multiple vertical columns (e.g., columns extending substantially perpendicular to the major surface of the substrate, i.e., in the y direction) with each column having multiple memory elements in each column. The columns may be arranged in a two dimensional configuration, e.g., in an x-z plane, resulting in a three dimensional arrangement of memory elements with elements on multiple vertically stacked memory planes. Other configurations of memory elements in three dimensions can also constitute a three dimensional memory array.

By way of non-limiting example, in a three dimensional NAND memory array, the memory elements may be coupled together to form a NAND string within a single horizontal (e.g., x-z) memory system levels. Alternatively, the memory elements may be coupled together to form a vertical NAND string that traverses across multiple horizontal memory system levels. Other three dimensional configurations can be envisioned wherein some NAND strings contain memory elements in a single memory level while other strings contain memory elements which span through multiple memory levels. Three dimensional memory arrays may also be designed in a NOR configuration and in a ReRAM configuration.

Typically, in a monolithic three dimensional memory array, one or more memory system levels are formed above a single substrate. Optionally, the monolithic three dimensional memory array may also have one or more memory layers at least partially within the single substrate. As a non-limiting example, the substrate may include a semiconductor such as silicon. In a monolithic three dimensional array, the layers constituting each memory system level of the array are typically formed on the layers of the underlying memory system levels of the array. However, layers of adjacent memory system levels of a monolithic three dimensional memory array may be shared or have intervening layers between memory system levels.

Then again, two dimensional arrays may be formed separately and then packaged together to form a non-monolithic memory system having multiple layers of memory. For example, non-monolithic stacked memories can be constructed by forming memory levels on separate substrates and then stacking the memory levels atop each other. The substrates may be thinned or removed from the memory system levels before stacking, but as the memory system levels are initially formed over separate substrates, the resulting memory arrays are not monolithic three dimensional memory arrays. Further, multiple two dimensional memory arrays or three dimensional memory arrays (monolithic or non-monolithic) may be formed on separate chips and then packaged together to form a stacked-chip memory system.

Associated circuitry is typically required for operation of the memory elements and for communication with the memory elements. As non-limiting examples, memory systems may have circuitry used for controlling and driving memory elements to accomplish functions such as programming and reading. This associated circuitry may be on the same substrate as the memory elements and/or on a separate substrate. For example, a controller for memory read-write operations may be located on a separate controller chip and/or on the same substrate as the memory elements.

One of skill in the art will recognize that this invention is not limited to the two dimensional and three dimensional exemplary structures described but cover all relevant memory structures within the spirit and scope of the invention as described herein and as understood by one of skill in the art.

It is intended that the foregoing detailed description be understood as an illustration of selected forms that the invention can take and not as a definition of the invention. It is only the following claims, including all equivalents, that are intended to define the scope of the claimed invention. Finally, it should be noted that any aspect of any of the preferred embodiments described herein can be used alone or in combination with one another.

What is claimed is:

1. A monitoring device comprising:
    an analog module configured to sense current on an output of a voltage regulator and to generate a digital representation of the sensed current, wherein the digital representation comprises a series of pulses, with values of amplitude of the series of pulses being selected from the group consisting of a first value and a second value; and
    a digital module configured to:
        input the digital representation of the sensed current;
        determine, based on a time period between at least two pulses in the series of pulses, whether the digital representation is indicative of excessive current draw; and
        in response to determining that the digital representation is indicative of excessive current draw, generate an interrupt, the interrupt signaling to a controller to modify operation of an electronic device comprising the controller.

2. The monitoring device of claim 1, wherein the digital module is configured to determine whether the digital representation is indicative of excessive current draw by:
    analyzing at least one aspect of the series of pulses; and
    comparing the analysis of the at least one aspect of the series of pulses to a threshold.

3. The monitoring device of claim 2, wherein the electronic device comprises a clock;
    wherein the digital module is configured to analyze the digital representation of the sensed current by counting a number of clock cycles of the clock between the two of the series of pulses; and
    wherein the digital module is configured to compare the analysis of the digital representation to a threshold by comparing the counted number of clock cycles to the threshold.

4. The monitoring device of claim 3, further comprising a threshold selection module configured to dynamically select the threshold.

5. The monitoring device of claim 4, wherein the threshold selection module is configured to select the threshold based on a current configuration of the electronic device.

6. The monitoring device of claim 5, wherein the electronic device comprises a plurality of components; and
    wherein the threshold selection module is configured to select the threshold based on which of the plurality of components are currently operating.

7. The monitoring device of claim 1, wherein the interrupt is indicative to a controller of the electronic device to turn off part, but not all, of the electronic device.

8. The monitoring device of claim 1, wherein a component of the electronic device is configured to operate in a first state and a second state, wherein in the first state, the component operates at a first level of non-zero operation and in the second state, the component operates at a second level of non-zero operation, the first level of non-zero operation being different than the second level of non-zero operation; and wherein the interrupt is signaling to the controller of the electronic device to modify operation of the component from the first level of non-zero operation to the second level of non-zero operation.

9. The monitoring device of claim 1, wherein the digital module is configured to determine the time period by using a clock signal to count a number of clock cycles between the two pulses.

10. A monitoring device comprising:
an analog module configured to sense current on an output of a voltage regulator and to generate a digital representation of the sensed current, wherein at least part of the digital representation is inversely proportional to the sensed current; and
a digital module configured to:
input the digital representation of the sensed current;
determine whether the digital representation is indicative of excessive current draw; and
in response to determining that the digital representation is indicative of excessive current draw, generate an interrupt, the interrupt signaling to a controller to modify operation of an electronic device comprising the controller.

11. A system on a chip comprising:
a voltage regulator including a regulated voltage output;
a current sensing and digital conversion module configured to sense current on the regulated voltage output and to generate a series of pulses based on the sensed current, wherein a time period between two of the series of pulses is indicative of the sensed current;
a time period analytical component configured to determine a time period between at least two pulses in the series of pulses and to generate, based on the time period, an interrupt; and
a performance monitoring unit configured to input the interrupt and to modify operation of at least a part of the system in response to receipt of the interrupt.

12. The system of claim 11, wherein the time period analytical component is configured to compare the time period to a threshold in order to determine whether the time period is indicative of excessive current draw and, in response to determining that the time period is indicative of excessive current draw, to generate the interrupt.

13. The system of claim 12, wherein the time period analytical component is configured to determine whether the time period is indicative of excessive current draw by comparing whether the time period is less than the threshold.

14. The system of claim 12, wherein the threshold is dynamically determined.

15. The system of claim 14, wherein the threshold is determined based on a current configuration of the system.

16. A method comprising:
sensing current on an output of a voltage regulator;
generating, based at least in part on the sensed current, a digital representation of the current, wherein generating the digital representation of the current comprises generating a series of pulses based on the sensed current;
determining a time period between at least two pulses in the series of pulses;
comparing the time period to a threshold;
determining, based on comparing the time period to the threshold, whether to generate an interrupt; and
in response to determining to generate the interrupt, generating the interrupt, the interrupt signaling to a controller to modify operation of an electronic device comprising the controller.

17. The method of claim 16, wherein determining the time period between the at least two pulses in the series of pulses comprises counting a number of clock cycles of a system clock between the at least two pulses in the series of pulses; and
wherein comparing the time period to the threshold comprises comparing the number of clock cycles to the threshold.

18. The method of claim 17, further comprising dynamically determining the threshold.

19. The method of claim 18, wherein dynamically determining the threshold comprises:
determining a current configuration of the electronic device; and
selecting the threshold based on the current configuration.

20. The method of claim 19, wherein the electronic device comprises a plurality of components;
wherein determining the current configuration of the electronic device comprises determining which of the plurality of components are currently operating; and
wherein selecting the threshold based on the current configuration comprises selecting the threshold based on which of the plurality of components are currently operating.

21. The method of claim 16, where the interrupt is signaling to the controller of the electronic device to modify operation of part or all of the electronic device.

* * * * *